US012566446B2

(12) United States Patent
Ikeda et al.

(10) Patent No.: US 12,566,446 B2
(45) Date of Patent: Mar. 3, 2026

(54) CONTROL DEVICE

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/674,069

(22) Filed: May 24, 2024

(65) Prior Publication Data

US 2024/0402713 A1 Dec. 5, 2024

(30) Foreign Application Priority Data

May 31, 2023 (JP) ................................ 2023-089454
Nov. 2, 2023 (JP) ................................ 2023-188091

(51) Int. Cl.
*G05D 1/00* (2024.01)
*G05D 1/221* (2024.01)
(Continued)

(52) U.S. Cl.
CPC .............. *G05D 1/221* (2024.01); *G06T 7/70* (2017.01); *G05D 2107/70* (2024.01);
(Continued)

(58) Field of Classification Search
CPC .............. G05D 1/221; G05D 2107/70; G05D 2109/10; G06T 7/70; G06T 2207/10028; G06T 2207/30252
(Continued)

(56) References Cited

U.S. PATENT DOCUMENTS

2017/0320529 A1 11/2017 Nordbruch
2020/0074681 A1 3/2020 Shi et al.

FOREIGN PATENT DOCUMENTS

JP 2001-229486 A 8/2001
JP 2017-220076 A 12/2017
(Continued)

OTHER PUBLICATIONS

Tianya Zhang and Peter J. Jin, "Roadside LiDAR Vehicle Detection and Tracking Using Range and Intensity Background Subtraction," Apr. 27, 2022, Journal of Advanced Transportation, vol. 2022, Article ID 2771085, whole document. (Year: 2022).*
(Continued)

*Primary Examiner* — Tiffany P Young
(74) *Attorney, Agent, or Firm* — Sughrue Mion, PLLC

(57) ABSTRACT

A control device used to generate a control command to cause a mobile object to move by driverless driving includes a matching section configured to perform matching using measured point cloud data and reference point cloud data in order to generate the control command, and a mobile object information acquisition section configured to acquire mobile object information by which an appearance feature of the mobile object is identified. The matching section is configured to perform the matching according to the mobile object information. The measured point cloud data is three-dimensional point cloud data on the mobile object acquired by using a distance measurement device. The reference point cloud data is date representing three-dimensional point cloud data for reference.

10 Claims, 8 Drawing Sheets

| IDENTIFICATION INFORMATION | APPEARANCE FEATURE (APPEARANCE SPECIFICATION) | MATCHING CONDITION |
|---|---|---|
| Vi1(Ti1,Ci1) | BS1 WHITE | MC1 TP1 ds1 |
| Vi2(Ti2,Ci2) | BS2 WHITE | MC2 TP2 ds1 |
| Vi3(Ti1,Ci3) | BS1 BLACK | MC3 TP1 ds2 |

VEHICLE INFORMATION

(51) Int. Cl.
    *G06T 7/00*         (2017.01)
    *G06T 7/70*         (2017.01)
    *G05D 107/70*      (2024.01)
    *G05D 109/10*      (2024.01)

(52) U.S. Cl.
    CPC .................... *G05D 2109/10* (2024.01); *G06T 2207/10028* (2013.01); *G06T 2207/30252* (2013.01)

(58) Field of Classification Search
    USPC ........................................................... 701/2
    See application file for complete search history.

(56)                 References Cited

FOREIGN PATENT DOCUMENTS

| JP | 2017-538619 A | 12/2017 |
| JP | 2020-034554 A | 3/2020 |

OTHER PUBLICATIONS

Zan Gojcic, Caifa Zhou, Jan D. Wegner, and Andreas Wieser, "The Perfect Match: 3D Point Cloud Matching with Smoothed Densities," Nov. 16, 2018, CVPR 2019, Cornell University, whole document. (Year: 2018).*

* cited by examiner

FIG. 3

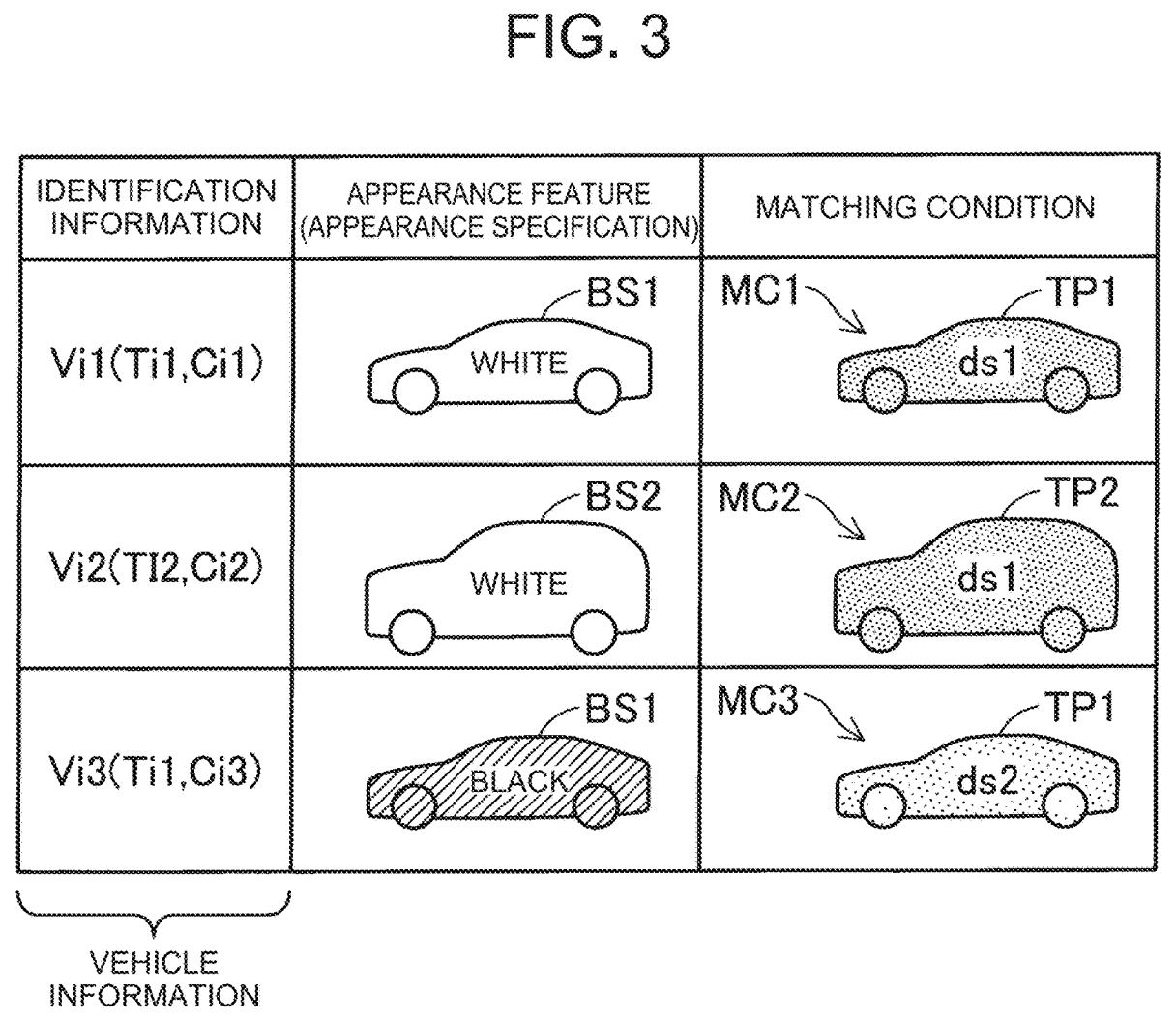

| IDENTIFICATION INFORMATION | APPEARANCE FEATURE (APPEARANCE SPECIFICATION) | MATCHING CONDITION |
|---|---|---|
| Vi1(Ti1,Ci1) | BS1 WHITE | MC1 → TP1 ds1 |
| Vi2(TI2,Ci2) | BS2 WHITE | MC2 → TP2 ds1 |
| Vi3(Ti1,Ci3) | BS1 BLACK | MC3 → TP1 ds2 |

VEHICLE INFORMATION

FIG. 4A

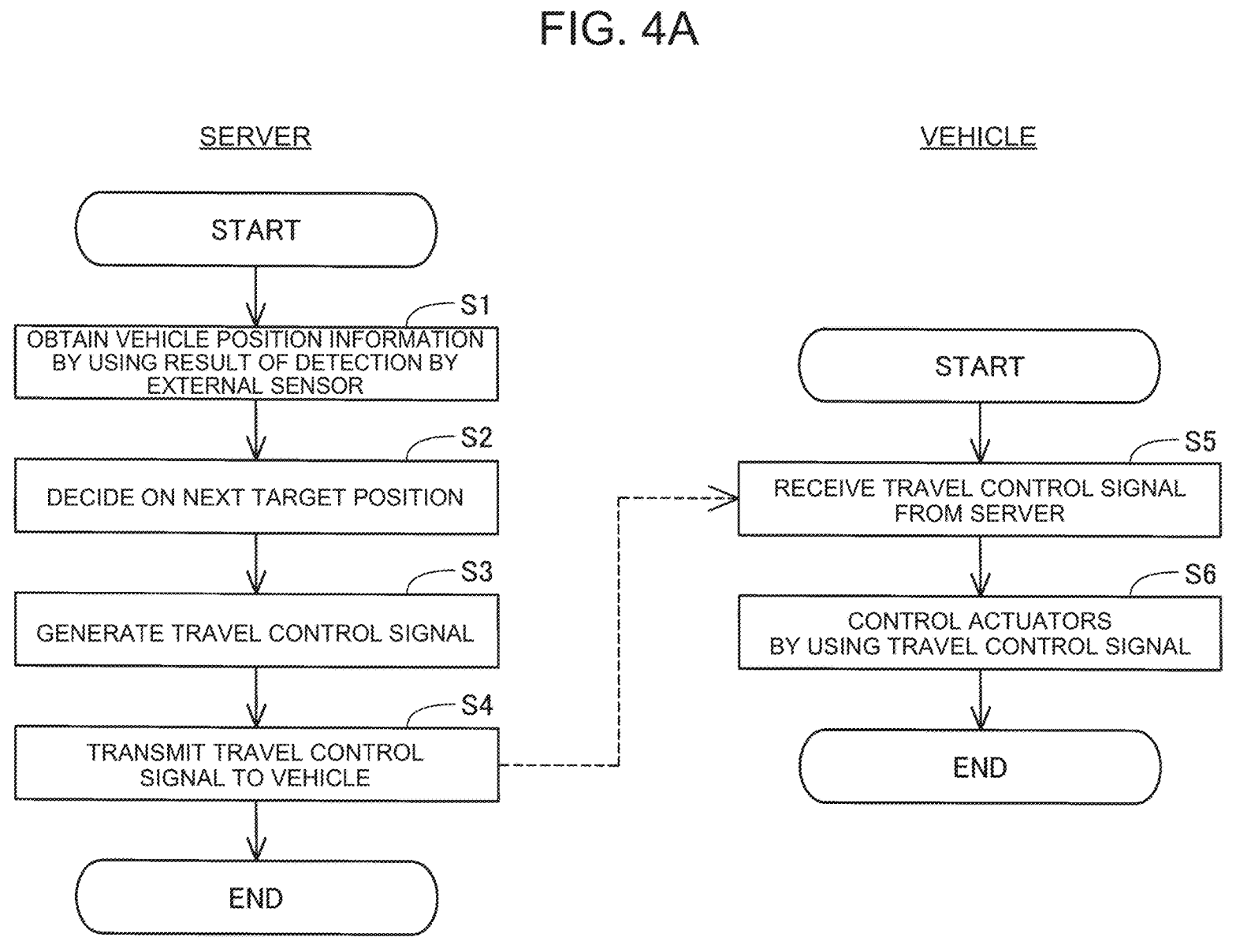

VEHICLE

START

S5 — RECEIVE TRAVEL CONTROL SIGNAL FROM SERVER

S6 — CONTROL ACTUATORS BY USING TRAVEL CONTROL SIGNAL

END

SERVER

START

S1 — OBTAIN VEHICLE POSITION INFORMATION BY USING RESULT OF DETECTION BY EXTERNAL SENSOR

S2 — DECIDE ON NEXT TARGET POSITION

S3 — GENERATE TRAVEL CONTROL SIGNAL

S4 — TRANSMIT TRAVEL CONTROL SIGNAL TO VEHICLE

END

| IDENTIFICATION INFORMATION | SEPARATE DISTANCE | MATCHING CONDITION |
|---|---|---|
| Vi1(Ti1,Ci1) | 300  100  BS1  WHITE  d1 | MC1  TP1  ds1 |
| Vi2(Ti2,Ci2) | 300  100  BS2  WHITE  d1 | MC2  TP2  ds1 |
| Vi2(Ti2,Ci2) | 300  100  BS2  WHITE  d2 | MC2b  TP2  ds1b |
| Vi3(Ti1,Ci3) | 300  100  BS1  BLACK  d1 | MC3  TP1  ds2 |
| Vi3(Ti1,Ci3) | 300  100  BS1  BLACK  d2 | MC3b  TP1  ds2b |

VEHICLE INFORMATION

VEHICLE

START

OBTAIN VEHICLE POSITION INFORMATION
BY USING RESULT OF DETECTION
BY EXTERNAL SENSOR — S11

DECIDE ON NEXT TARGET POSITION — S21

GENERATE TRAVEL CONTROL SIGNAL — S31

CONTROL ACTUATORS
BY USING TRAVEL CONTROL SIGNAL — S41

END

CONTROL DEVICE

CROSS-REFERENCE TO RELATED APPLICATION

This application claims priority to Japanese Patent Application No. 2023-089454 filed on May 31, 2023 and Japanese Patent Application No. 2023-188091 filed on Nov. 2, 2023, each incorporated herein by reference in its entirety.

BACKGROUND

1. Technical Field

The present disclosure relates to a control device.

2. Description of Related Art

Japanese Unexamined Patent Application Publication (Translation of PCT application) No. 2017-538619 discloses a technology in which in a process of manufacturing a vehicle, the vehicle is caused to travel autonomously or by remote control.

SUMMARY

To control movement of a mobile object, such as a vehicle, by autonomous control or remote control, there has been known a technology in which a position and an orientation of a mobile object are estimated by matching using three-dimensional point cloud data on the mobile object acquired by using a distance measurement device. To appropriately control movement of a mobile object, there is a desire for a technology for enhancing accuracy in such matching.

The present disclosure can be implemented in forms as follows.

A control device used to generate a control command to cause a mobile object to move by driverless driving, according to a first aspect of the present disclosure, includes a matching section configured to perform matching using measured point cloud data and reference point cloud data in order to generate the control command, and a mobile object information acquisition section configured to acquire mobile object information by which an appearance feature of the mobile object is identified. The matching section is configured to perform the matching according to the mobile object information. The measured point cloud data is three-dimensional point cloud data on the mobile object acquired by using a distance measurement device. The reference point cloud data is date representing three-dimensional point cloud data for reference. According to such a form, matching using measured point cloud data on a mobile object can be performed according to an appearance feature of the mobile object. Accordingly, the possibility increases that the matching can be performed with accuracy.

In the control device according to the first aspect of the present disclosure, the mobile object information may include model code information by which a model code of the mobile object is identified. The reference point cloud data may include model code point cloud data corresponding to the model code. The matching section may be configured to perform the matching by using the model code point cloud data according to the model code information. According to such a form, since model code point cloud data corresponding to the model code of a mobile object can be used in matching, the possibility further increases that the matching can be performed with accuracy.

In the control device according to the first aspect of the present disclosure, the mobile object information may include, as the model code information, manufacture information used to manage process of manufacturing the mobile object. According to such a form, manufacture information can be used for model code information.

In the control device according to the first aspect of the present disclosure, the matching section may be configured to change at least one of density of point cloud in the measured point cloud data and density of point cloud in the reference point cloud data, according to the mobile object information. According to such a form, by changing at least one of the density of point cloud in the measured point cloud data and the density of the point cloud in the reference point cloud data in matching according to mobile object information, the possibility can be increased that the matching can be performed with accuracy.

In the control device according to the first aspect of the present disclosure, the matching section may be configured to change at least one of the density of the point cloud in the measured point cloud data and the density of the point cloud in the reference point cloud data, according to a distance between the distance measurement device and the mobile object. According to such a form, since at least one of the density of the point cloud in the measured point cloud data and the density of the point cloud in the reference point cloud data in matching is changed according to the distance between a distance measurement device and a mobile object in addition to mobile object information, the possibility can be further increased that the matching can be performed with accuracy.

A control device used to generate a control command to cause a mobile object to move by driverless driving, according to a second aspect of the present disclosure, includes a processor. The processor is configured to perform matching using measured point cloud data and reference point cloud data in order to generate the control command. The processor is configured to acquire mobile object information by which an appearance feature of the mobile object is identified. The processor is configured to perform the matching according to the mobile object information. The measured point cloud data is three-dimensional point cloud data on the mobile object acquired by using a distance measurement device. The reference point cloud data is date representing three-dimensional point cloud data for reference.

The present disclosure can be implemented in forms other than the above-described forms as the control devices, for example, as a system, a control method, a computer program for implementing the control method, a non-transitory storage medium storing the computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is an explanatory diagram showing an example of matching conditions in a first embodiment;

FIG. 4A is a flowchart showing a processing procedure for vehicle travel control in the first embodiment;

DETAILED DESCRIPTION OF EMBODIMENTS

A. First Embodiment

Figure 1:
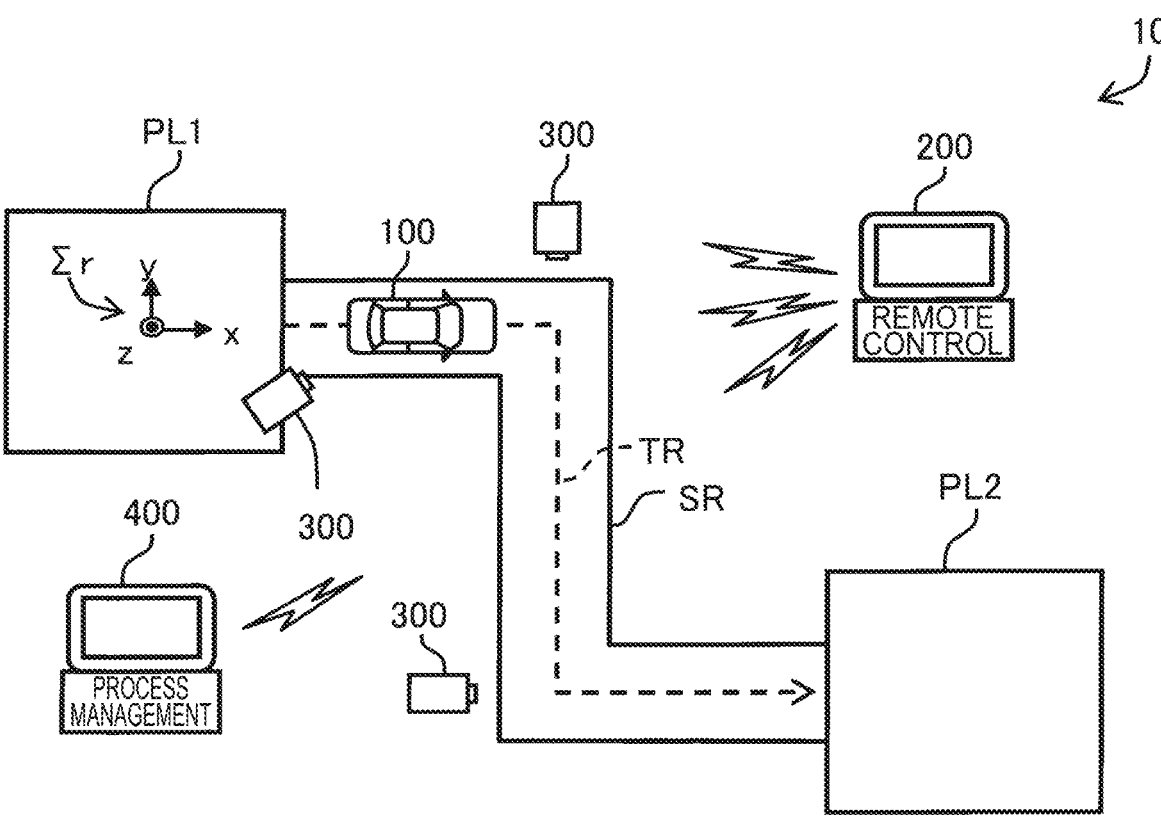
FIG. 1 is a conceptual diagram showing a configuration of a system.

FIG. 1 is a conceptual diagram showing a configuration of a system 10 in the present embodiment. The system 10 includes one or more vehicles 100 each as a mobile object, a server 200 used to generate a control command to remotely control the vehicle 100, a plurality of distance measurement devices 300 that measures three-dimensional point cloud data on the vehicle 100, and a process management device 400 that performs management of the process of manufacturing the vehicle 100. In the first embodiment, the server 200 is an example of "control device" in the present disclosure.

In the present disclosure, a "mobile object" refers to an object that can move, and examples thereof include a vehicle and an electric vertical takeoff and landing aircraft (so-called flying car). The vehicle 100 may be a vehicle that travels with wheels or a vehicle that travels with endless track, and examples thereof include a passenger car, a motor truck, a bus, a two-wheel vehicle, a four-wheel vehicle, a tank, a construction vehicle, and the like. Vehicles 100 include a battery electric vehicle (BEV), a gasoline vehicle, a hybrid electric vehicle, and a fuel cell electric vehicle. When a mobile object is other than the vehicle 100, expressions "vehicle" and "car" in the present disclosure can be replaced with "mobile object" as appropriate, and an expression "travel" can be replaced with "move" as appropriate.

The vehicle 100 is configured to be able to travel by driverless driving. "Driverless driving" refers to driving not based on traveling maneuvers by an occupant. A traveling maneuver refers to a maneuver related to at least any one of "traveling", "turning", and "stopping" of the vehicle 100. The driverless driving is implemented by automatic or manual remote control using a device located outside of the vehicle 100, or by autonomous control by the vehicle 100. An occupant who does not perform traveling maneuvers may be on board the vehicle 100 that is traveling by driverless driving. Examples of the occupant who does not perform traveling maneuvers include a person who simply sits in a seat of the vehicle 100 and a person who does work different from traveling maneuvers, such as installation, inspection, or operation of switches and the like, while on board the vehicle 100. Note that the driving based on traveling maneuvers by an occupant is referred to as "manned driving" in some cases.

In the present description, "remote control" includes "full remote control" in which all operations of the vehicle 100 are completely decided from outside of the vehicle 100, and "partial remote control" in which one or some of the operations of the vehicle 100 are decided from outside of the vehicle 100. "Autonomous control" includes "full autonomous control" in which the vehicle 100 autonomously controls own operations without receiving any information from a device outside of the vehicle 100, and "partial autonomous control" in which the vehicle 100 autonomously controls own operations by using information received from a device outside of the vehicle 100.

It is preferable that the vehicle 100 be a battery electric vehicle (BEV).

The system 10 in the present embodiment is configured as a remote control system that causes the vehicle 100 to travel by remote control. In the present embodiment, remote control of the vehicle 100 is performed in a factory where the vehicle 100 is manufactured. The factory includes a first place PL1 and a second place PL2. The first place PL1 is, for example, a place where assembly of the vehicle 100 is conducted, and the second place PL2 is, for example, a place where inspection of the vehicle 100 is conducted. The first place PL1 and the second place PL2 are connected by a drive lane SR on which the vehicle 100 can travel. An arbitrary position in the factory is represented by xyz-coordinate values of a standard coordinate system $\Sigma r$.

The plurality of distance measurement devices 300 is installed around the drive lane SR, for the vehicle 100 as a subject of measurement. The server 200 can acquire, in real time, the relative position and the relative orientation of the vehicle 100 with respect to a target route TR, as well as a direction in which the vehicle 100 travels, by using three-dimensional point cloud data measured by each distance measurement device 300. For a distance measurement device 300, a camera or a light detection and ranging (LiDAR) can be used. The LiDAR, in particular, is preferable in the point that high-precision three-dimensional point cloud data can be obtained. Each distance measurement device 300 in the present embodiment is configured by using a LiDAR. In the present embodiment, the position of each distance measurement device 300 is fixed, and a relative relationship between the standard coordinate system $\Sigma r$ and a device coordinate system of each distance measurement device 300 is known. A coordinate transformation matrix for transforming coordinate values of the standard coordinate system $\Sigma r$ into coordinate values of the device coordinate system of each distance measurement device 300, and vice versa, is stored in the server 200 beforehand.

The server 200 in the present embodiment is configured as a remote control device that generates, and transmits to the vehicle 100, a control command for remote control of the vehicle 100. More specifically, the server 200 generates a control command to cause the vehicle 100 to travel along the target route TR, and transmits the control command to the vehicle 100. The vehicle 100 travels according to the received control command. Accordingly, with the system 10, the vehicle 100 can be moved from the first place PL1 to the second place PL2 by remote control, without using transport equipment such as a crane or a conveyor. Note that the target route TR in the present embodiment corresponds to a reference path, which will be described later. Details of the control command will be described later.

Figure 2:
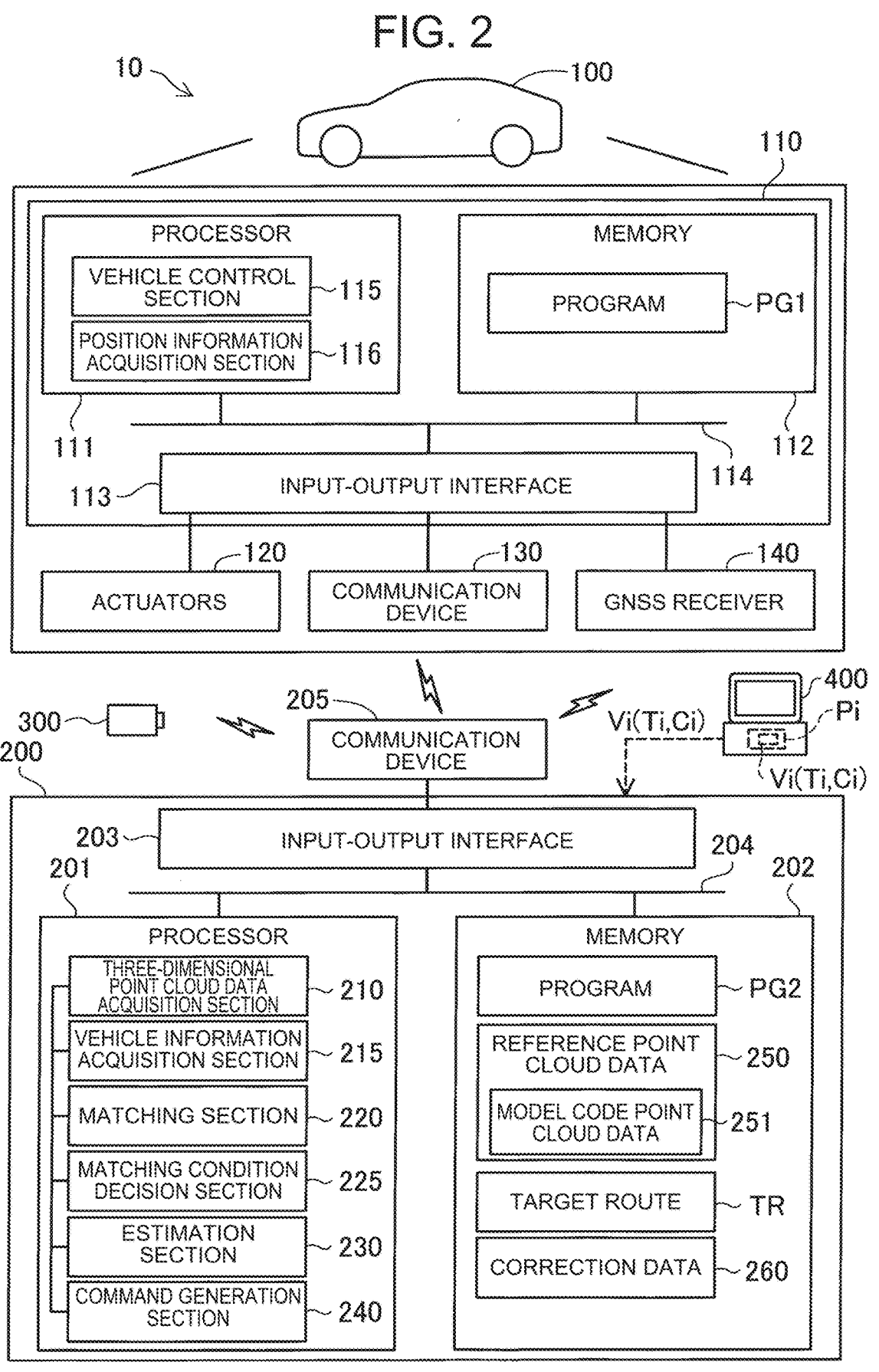
FIG. 2 is a block diagram showing configurations of a vehicle and a control device.

FIG. 2 is a block diagram showing configurations of the vehicle 100 and the server 200. The vehicle 100 includes: a vehicle control device 110 for controlling each part of the vehicle 100; actuators 120 that drive under control of the vehicle control device 110; a communication device 130 for communicating with the server 200 through wireless communication; and a global navigation satellite system (GNSS) receiver 140 for acquiring position information on the vehicle 100. In the present embodiment, the actuators 120 include an actuator of a drive train for accelerating the vehicle 100, an actuator of a steering system for changing the traveling direction of the vehicle 100, and an actuator of a braking device for decelerating the vehicle 100. The drive train includes a battery, a traction motor driven by electricity from the battery, and drive wheels rotated by the traction motor. The actuator of the drive train includes the traction motor. Note that the actuators 120 may further include an actuator for swinging a wiper of the vehicle 100, an actuator for opening and closing a power window of the vehicle 100, and the like.

The vehicle control device 110 is configured by using a computer including a processor 111, a memory 112, an input-output interface 113, and an internal bus 114. The processor 111, the memory 112, and the input-output interface 113 are connected through the internal bus 114 in such a manner as to be able to perform bi-directional communication. The actuators 120, the communication device 130, and the GNSS receiver 140 are connected to the input-output interface 113.

In the present embodiment, the processor 111 functions as a vehicle control section 115 and a position information acquisition section 116 by executing a program PG1 stored in the memory 112 beforehand. The vehicle control section 115 controls the actuators 120. When a driver is on board the vehicle 100, the vehicle control section 115 can cause the vehicle 100 to travel by controlling the actuators 120 according to maneuvers by the driver. The vehicle control section 115 can also cause the vehicle 100 to travel by controlling the actuators 120 according to a control command transmitted from the server 200, regardless of whether or not a driver is on board the vehicle 100. The position information acquisition section 116 acquires position information indicating the current position of the vehicle 100, by using the GNSS receiver 140. However, the position information acquisition section 116 and the GNSS receiver 140 can be omitted.

The server 200 is configured by using a computer including a processor 201, a memory 202, an input-output interface 203, and an internal bus 204. The processor 201, the memory 202, and the input-output interface 203 are connected through the internal bus 204 in such a manner as to be able to perform bi-directional communication. A communication device 205 for communicating with the vehicle 100, the distance measurement devices 300, and the process management device 400 through wireless communication is connected to the input-output interface 203.

In the present embodiment, the processor 201 functions as a three-dimensional point cloud data acquisition section 210, a vehicle information acquisition section 215, a matching section 220, a matching condition decision section 225, an estimation section 230, and a command generation section 240 by executing a program PG2 stored in the memory 202 beforehand. In addition to the program PG2, reference point cloud data 250, which will be described later, the target route TR, and correction data 260 are stored in the memory 202.

The three-dimensional point cloud data acquisition section 210 acquires three-dimensional point cloud data on the vehicle 100 measured by each distance measurement device 300. The three-dimensional point cloud data is data indicating the three-dimensional positions of points detected by each distance measurement device 300. Three-dimensional point cloud data on a mobile object measured by a distance measurement device 300 is also referred to as measured point cloud data.

The vehicle information acquisition section 215 acquires vehicle information by which an appearance feature of the vehicle 100 can be identified. The vehicle information acquisition section 215 corresponds to a mobile object information acquisition section that acquires mobile object information by which an appearance feature of a mobile object can be identified. The vehicle information is information by which, for example, a shape, a color, a pattern, a shine, or the like, among the appearance features of the vehicle 100, can be identified. More specifically, the vehicle information may be information by which, for example, the body shape of the vehicle 100, the presence or absence and the type of an exterior part, a body color, a body material, or the state of a body coating can be identified. The state of a body coating is, for example, the presence or absence of a body coating, the number of times a body coating is applied, or the type of coating material.

The vehicle information in the present embodiment includes identification information Vi on the vehicle 100. The identification information Vi is an example of manufacture information used to manage the process of manufacturing the vehicle 100. The identification information Vi includes model code information Ti by which the model code of the vehicle 100 can be identified. Further, the identification information Vi in the present embodiment includes body color information Ci by which the body color of the vehicle 100 can be identified. In the present description, a "model code" refers to information that specifies at least the body shape of the vehicle 100, among the appearance features of the vehicle 100. In another embodiment, a "model code" may be information that specifies, in addition to the body shape, various appearance features of the vehicle 100, such as the body color of the vehicle 100, and the presence or absence and the type of an exterior part.

The matching section 220 performs template matching (hereinafter, also simply referred to as matching) using the measured point cloud data and the reference point cloud data 250. The matching is performed to generate a control command to the vehicle 100. For an algorithm of the matching, any of various algorithms, such as iterative closest point (ICP) and normal distributions transform (NDT), can be used.

The reference point cloud data 250 in the present embodiment includes model code point cloud data 251 that corresponds to the model code of the vehicle 100. More specifically, to correspond to a plurality of model codes, the reference point cloud data 250 includes a plurality of model code point cloud data 251 associated with the individual model codes, respectively.

The matching condition decision section 225 decides on a matching condition, depending on the vehicle information acquired by the vehicle information acquisition section 215. The matching section 220 performs matching, according to the matching condition decided by the matching condition decision section 225. In other words, the matching section 220 performs matching according to the vehicle information. Details of the matching condition will be described later.

FIG. 3 is an explanatory diagram showing an example of matching conditions decided in the present embodiment. FIG. 3 shows correspondences between identification information Vi and matching conditions. More specifically, FIG. 3 shows identification information Vi, appearance features (appearance specifications) identified by the identification information Vi, respectively, and matching conditions decided depending on the identification information Vi, respectively.

Identification information Vi1 shown in FIG. 3 includes model code information Ti1 and body color information Ci1. Identification information Vi2 includes model code information Ti2 and body color information Ci2. Identification information Vi3 includes the model code information Ti1 and body color information Ci3. The model code information Ti1 is model code information Ti by which a model code specifying a body shape BS1 can be identified. The model code information Ti2 is model code information Ti by which a model code specifying a body shape BS2 can be identified. Each of the body color information Ci1 and the body color information Ci2 is information specifying white as a body color. The body color information Ci3 is information specifying black as a body color. In other words, for example, a vehicle 100 identified by the identification information Vi1 has the body shape BSI and a body color of white.

As shown in FIG. 3, a matching condition MC1 is applied correspondingly to the identification information Vi1. The matching condition MC1 prescribes that model code point cloud data TP1 is used in matching and the density of point cloud in the model code point cloud data TP1 is set to a density ds1. A matching condition MC2 is applied correspondingly to the identification information Vi2. The matching condition MC2 prescribes that model code point cloud data TP2 is used in matching and the density of point cloud in the model code point cloud data TP2 is set to the density ds1. A matching condition MC3 is applied correspondingly to the identification information Vi3. The matching condition MC3 prescribes that the model code point cloud data TP1 is used in matching and the density of point cloud in the model code point cloud data TP1 is set to a density ds2. The density ds2 is a lower density than the density ds1.

The estimation section 230 estimates a position and an orientation of the vehicle 100 by using a result of the matching performed by the matching section 220. The position and the orientation thus estimated by the estimation section 230 correspond to vehicle position information, which will be described later. In the present embodiment, the position of the vehicle 100 is estimated as xyz coordinates of a predetermined detection point on the vehicle 100. The orientation of the vehicle 100 is calculated as the orientation of a vector that goes along a center axis of the vehicle 100 and goes from a rear side toward a front side of the vehicle 100. For example, the vector is identified by using the coordinates of a center position in a vehicle-width direction on the front side of the vehicle 100, and the coordinates of a center position in the vehicle-width direction on the rear side of the vehicle 100. Note that the position and the orientation of the vehicle 100 only need to be estimated in such a manner as to be usable in generation of a control command for driverless driving, and aspects of the position estimation and the orientation estimation are not limited to those described above. When the three-dimensional point cloud data cannot be used, the estimation section 230 can estimate the position and the orientation of the vehicle 100 by using travel history of the vehicle 100 or position information detected by the GNSS receiver 140 mounted in the vehicle 100. The estimation section 230 may estimate only one of the position and the orientation of the vehicle 100. In such a case, the other one of the position and the orientation of the vehicle 100 is determined by using, for example, the travel history of the vehicle 100. Note that the direction in which the vehicle 100 travels can be estimated by using, for example, any one, or two or more, of the orientation of the vehicle 100, the travel history, and history of control commands.

By using the estimated position and orientation of the vehicle 100, the command generation section 240 generates a control command to cause the vehicle 100 to travel by driverless driving and transmits the control command to the vehicle 100. In the present embodiment, the control command is a command to cause the vehicle 100 to travel according to the target route TR stored in the memory 202. Specifically, the control command in the present embodiment is a travel control signal, which will be described later.

Note that the control command to cause the vehicle 100 to travel by driverless driving may include at least one of the travel control signal and generation information for generating the travel control signal. Accordingly, in another embodiment, the control command may include the generation information in place of, or in addition to, the travel control signal. For the generation information, for example, vehicle position information, a path, or a target position, which will be described later, can be used.

The process management device 400 in the present embodiment is configured by using a computer. The process management device 400 performs management of the entire process of manufacturing vehicles 100 in the factory, according to various manufacture information included in manufacture information data Pi. The manufacture information data Pi includes the identification information Vi described above. For example, the identification information Vi is acquired by the process management device 400 via short-range wireless communication from a radio frequency-identification (RF-ID) tag attached to the vehicle 100. For example, when one vehicle 100 starts traveling along the target route TR, identification information Vi by which the vehicle 100 is identified is transmitted from the process management device 400 to the server 200. The position of the vehicle 100 detected by the server 200 is also transmitted to the process management device 400. Note that functionality of the process management device 400 may be implemented in the same device as the server 200.

FIG. 4A is a flowchart showing a processing procedure for travel control of the vehicle 100 in a first embodiment. In S1, the server 200 obtains vehicle position information on the vehicle 100, by using a result of detection output from an external sensor that is a sensor located outside of the vehicle 100. The vehicle position information is position information that serves as a base for generating a travel control signal. In the present embodiment, the vehicle position information includes the position and the orientation of the vehicle 100 in the standard coordinate system Σr of the factory. In the present embodiment, the standard coordinate system Σr of the factory is a global coordinate system, and an arbitrary position in the factory is represented by X, Y, Z coordinates in the global coordinate system. In the present embodiment, the external sensor is a distance measurement device 300 installed in the factory, and measured point cloud data, as a result of detection, is output from each distance measurement device 300. In other words, in S1, the server 200 obtains vehicle position information by using measured point cloud data acquired from a distance measurement device 300 that is an external sensor. Specifically, the server 200 obtains the vehicle position information through template matching using the measured point cloud data and the reference point cloud data 250.

In S2, the server 200 decides on a target position for the vehicle 100 to head for next. In the present embodiment, the target position is represented by X, Y, Z coordinates in the global coordinate system. A reference path, which is a path for the vehicle 100 to travel along, is stored in the memory of the server 200 beforehand. The path is represented by a node indicating a departure point, a node indicating a waypoint, a node indicating a destination, and links connecting each node. The server 200 decides on the target position for the vehicle 100 to head for next, by using the vehicle position information and the reference path. The server 200 decides on the target position on the reference path ahead of the current position of the vehicle 100.

In S3, the server 200 generates a travel control signal for causing the vehicle 100 to travel toward the decided target position. In the present embodiment, the travel control signal includes an acceleration rate and a steering wheel angle of the vehicle 100 as parameters. The server 200 calculates the travel speed of the vehicle 100 from changes in position of the vehicle 100, and compares the calculated travel speed with a target speed. The server 200 decides on an acceleration rate such as to cause the vehicle 100 to accelerate when the travel speed is less than the target speed as a whole, and decides on an acceleration rate such as to cause the vehicle 100 to decelerate when the travel speed is more than the target speed as a whole. Moreover, the server 200 decides on a steering wheel angle and an acceleration rate such as to cause the vehicle 100 not to deviate from the reference path when the vehicle 100 is positioned on the reference path, and decides on a steering wheel angle and an acceleration rate such as to cause the vehicle 100 to return to the reference path when the vehicle 100 is not positioned on the reference path, in other words, when the vehicle 100 deviates from the reference path. In another embodiment, the travel control signal may include a speed of the vehicle 100 as a parameter in place of, or in addition to, an acceleration rate of the vehicle 100.

In S4, the server 200 transmits the generated travel control signal to the vehicle 100. The server 200 repeats the cycle of obtaining vehicle position information, deciding on a target position, generating a travel control signal, transmitting the travel control signal, and the like, in each predetermined period.

Note that in S1 to S4 in the present embodiment, specifically, a command generation process, which will be described later, is executed.

In S5, the vehicle 100 receives the travel control signal transmitted from the server 200. In S6, the vehicle 100 controls the actuators of the vehicle 100 by using the received travel control signal, whereby the vehicle 100 is caused to travel at the acceleration rate and the steering wheel angle indicated by the travel control signal. The vehicle 100 repeats the cycle of receiving a travel control signal and controlling the actuators of the vehicle 100, in each predetermined period. According to the system 10 in the present embodiment, it is possible to cause the vehicle 100 to travel by remote control, and to move the vehicle 100 without using transport equipment such as a crane or a conveyor.

Figure 4B:
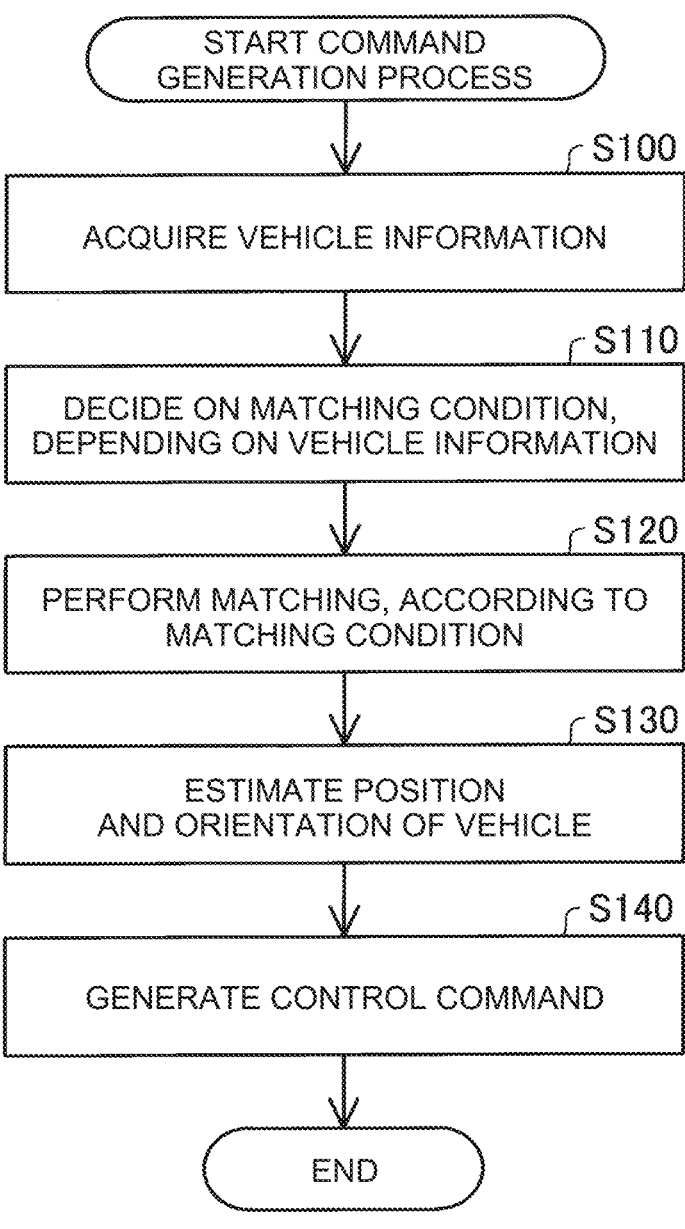
FIG. 4B is a flowchart of a command generation process.

FIG. 4B is a flowchart of the command generation process for implementing a control method in the present embodiment. The command generation process is executed each time the three-dimensional point cloud data acquisition section 210 acquires new measured point cloud data from a distance measurement device 300 in charge of measuring the vehicle 100 under driverless driving. For example, prior to start of the command generation process, the three-dimensional point cloud data acquisition section 210 may execute a preprocess of removing background point cloud data representing a stationary object from the newly acquired measured point cloud data. Hereinafter, the vehicle 100 under driverless driving is also referred to as the target vehicle 100.

In S100, the vehicle information acquisition section 215 acquires vehicle information on the target vehicle 100. In S100 in the present embodiment, the vehicle information acquisition section 215 acquires, as the vehicle information, identification information Vi transmitted from the process management device 400. In S110, the matching condition decision section 225 decides on a matching condition, depending on the vehicle information acquired in S100. In S120, the matching section 220 performs matching, according to the matching condition decided in S110.

In the present embodiment, in S120, the matching section 220 performs the matching by using the model code point cloud data TP1 or the model code point cloud data TP2, according to the model code information Ti. For example, when the body shape of the target vehicle 100 is the body shape BS1 and the body color thereof is white, the identification information Vi1 shown in FIG. 3 is acquired as vehicle information on the vehicle 100 in S100. In such a case, in S120, the model code point cloud data TP1 is used in matching, according to the matching condition MC1 decided in S110. When the body shape of the target vehicle 100 is the body shape BS2 and the body color thereof is white, the identification information Vi2 is acquired as vehicle information on the target vehicle 100 in S100. In such a case, in S120, the model code point cloud data TP2 is used in matching, according to the matching condition MC2 decided in S110.

Moreover, in the present embodiment, in S120, the matching section 220 changes the density of point cloud in the matching, according to the vehicle information. More specifically, the matching section 220 changes the density of point cloud in the reference point cloud data 250, according to the body color information Ci. For example, when the body shape of the target vehicle 100 is the body shape BS1 and the body color thereof is black, the identification information Vi3 is acquired as vehicle information on the target vehicle 100 in S100. In such a case, in S120, the matching is performed in a state where the density of point cloud in the model code point cloud data TP1 is set to the density ds2, according to the matching condition MC3 decided in S110. When the identification information Vi1 is acquired in S100 as described above, in S120, the matching is performed in a state where the density of the point cloud in the model code point cloud data TP1 is set to the density ds1, according to the matching condition MC1.

The matching section 220 in the present embodiment uses the correction data 260 to implement the change in density of the point cloud according to the vehicle information. The correction data 260 is data for correcting the density of the point cloud in the reference point cloud data 250, and is data in which, for example, a decrease rate by which the density of the point cloud in the reference point cloud data 250 is decreased is recorded for each body color. Note that in another embodiment, for example, reference point cloud data 250 including a different density from the others may be recorded for each body color in the memory 202, and the matching section 220 may use reference point cloud data 250 according to the vehicle information in matching, whereby the change in density of the point cloud according to the vehicle information may be implemented.

An appearance feature of a vehicle 100, particularly, a body color or the state of a body coating affects the density of point cloud in measured point cloud data on the vehicle 100. For example, when the body color of the vehicle 100 is white, the light reflectance of a body surface of the vehicle 100 is higher than, for example, when the body color is black, and the density of the point cloud in the measured point cloud data is therefore higher. Accordingly, as in the present embodiment, matching is performed by setting the density of the point cloud in the reference point cloud data 250 to the density ds1 for a vehicle 100 with a body color of white, and matching is performed by setting the density of the point cloud in the reference point cloud data 250 to the density ds2 that is lower than the density ds1 for a vehicle 100 with a body color of black, whereby the possibility increases that accuracy in matching for each vehicle 100 can be enhanced. The correction data 260 mentioned above is defined based on a result of an experiment or a simulation, for example, in such a manner that accuracy in matching for each vehicle 100 with each body color becomes a predetermined accuracy or more. Note that in another embodiment, in matching, the density of the point cloud in measured point cloud data may be changed according to the vehicle information. Moreover, in matching, both the density of the point cloud in measured point cloud data and the density of the point cloud in the reference point cloud data 250 may be changed according to the vehicle information.

In S130, the estimation section 230 estimates a position and an orientation of the target vehicle 100 by using a result of the matching performed in S120. In S140, the command generation section 240 generates a control command by using the position and the orientation estimated in S130. The thus generated control command is transmitted to the target vehicle 100. The vehicle control section 115 of the target vehicle 100 causes the target vehicle 100 to travel by controlling the actuators 120 by using the received control command.

According to the server 200 in the present embodiment described above, the matching section 220 performs matching according to vehicle information by which an appearance feature of a vehicle 100 under control can be identified. Thus, the matching can be performed according to the appearance feature of the vehicle 100. Accordingly, for example, even if various vehicles 100 with different appearance features from each other are to be remotely controlled, matching can be performed according to an appearance feature of each vehicle 100. Accordingly, the possibility increases that matching can be performed with accuracy in the system 10.

Moreover, in the present embodiment, the matching section 220 performs matching by using the model code point cloud data 251 according to the model code information Ti. Thus, since the model code point cloud data 251 corresponding to the model code of a vehicle 100 can be used in matching, the possibility further increases that the matching can be performed with accuracy.

Further, in the present embodiment, the vehicle information includes manufacture information on a vehicle 100, as the model code information Ti. Thus, the manufacture information on the vehicle 100 can be used for the model code information Ti. Accordingly, for example, in the factory where the vehicle 100 is manufactured, matching using the model code point cloud data 251 can be easily performed, by using the manufacture information on the vehicle 100 for the model code information Ti.

Furthermore, in the present embodiment, the matching section 220 changes at least one of the density of the point cloud in measured point cloud data and the density of the point cloud in the reference point cloud data 250, according to the vehicle information. Accordingly, by changing the density of the point cloud in matching according to the vehicle information, the possibility can be increased that the matching can be performed with accuracy.

B. Second Embodiment

Figure 5:
FIG. 5 is an explanatory diagram showing an example of matching conditions in a second embodiment.

FIG. 5 is a schematic diagram for describing an example of matching conditions decided in a second embodiment. FIG. 5 shows correspondences between combinations of vehicle information and a separate distance, and matching conditions. A "separate distance" represents a distance between a target vehicle 100 and a distance measurement device 300 in charge of measuring the target vehicle 100. In the present embodiment, for the separate distance in respect of the vehicle 100, a distance measured by a distance measurement device 300 is used. In the second embodiment, unlike the first embodiment, the density of the point cloud in matching is changed according to the separate distance, in addition to the vehicle information. In configurations of the server 200 and the system 10 in the second embodiment, parts that are not particularly described are similar to those in the first embodiment.

In the example in FIG. 5, a matching condition MC1 is applied correspondingly to a combination of identification information Vi1 and a separate distance d1. A matching condition MC2 is applied correspondingly to a combination of identification information Vi2 and the separate distance d1. A matching condition MC2$b$ is applied correspondingly to a combination of the identification information Vi2 and a separate distance d2. The separate distance d2 is longer than the separate distance d1. The matching condition MC2$b$ specifies that the density of the point cloud in matching is a density ds1$b$ that is lower than a density ds1 specified by the matching condition MC2. A matching condition MC3 is applied correspondingly to a combination of identification information Vi3 and the separate distance d1. A matching condition MC3$b$ is applied correspondingly to a combination of the identification information Vi3 and the separate distance d2. The matching condition MC3$b$ specifies that the density of the point cloud in matching is a density ds2$b$ that is lower than a density ds2 specified by the matching condition MC3. In general, the density of the point cloud in measured point cloud data on a vehicle 100 becomes higher as the separate distance in respect of the vehicle 100 becomes shorter, and becomes lower as the separate distance in respect of the vehicle 100 becomes longer. Accordingly, as in the present embodiment, when the separate distance is longer, the density of the point cloud in the reference point cloud data 250 is made lower in matching, whereby the possibility further increases that accuracy in the matching can be enhanced.

The change in density of the point cloud according to the separate distance as described above can be implemented, for example, by defining the correction data 260 in such a manner as to correct the density of the point cloud in the reference point cloud data 250 according to the separate distance, in addition to the vehicle information. In such a case, the correction data 260 is defined based on a result of an experiment or a simulation, for example, in such a manner that accuracy in matching in each of cases of different separate distances becomes a predetermined accuracy or more. Note that in another embodiment, in matching, the density of the point cloud in measured point cloud data may be changed according to the separate distance. Moreover, in matching, both the density of the point cloud in measured point cloud data and the density of the point cloud in the reference point cloud data 250 may be changed according to the separate distance.

According to the second embodiment described above, the matching section 220 changes at least one of the density of the point cloud in measured point cloud data and the density of the point cloud in the reference point cloud data 250, according to the separate distance between a distance measurement device 300 and the vehicle 100. Accordingly, the possibility can be further increased that matching can be performed with accuracy.

C. Third Embodiment

Figure 6:
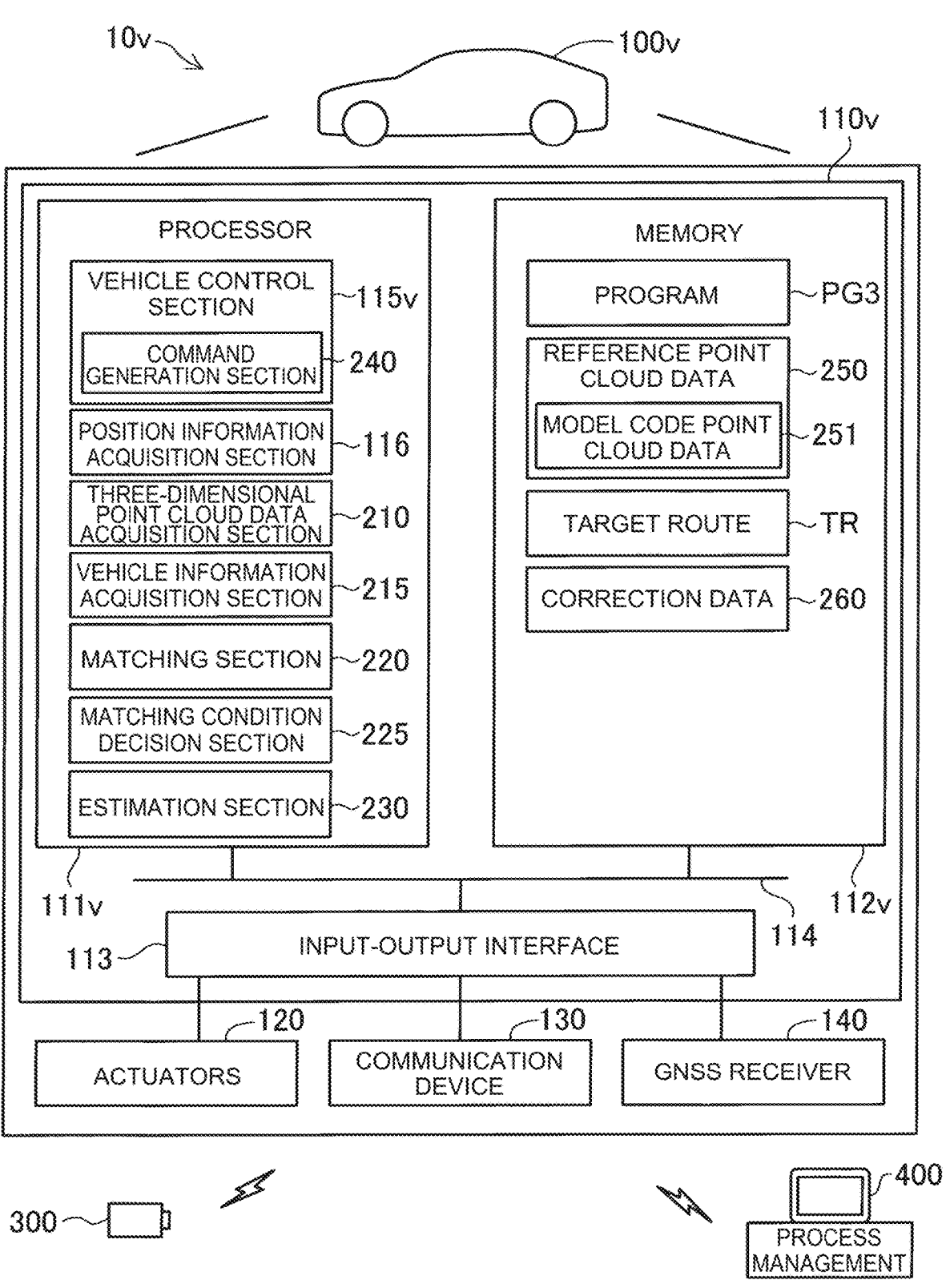
FIG. 6 is a conceptual diagram showing a configuration of a system in a third embodiment.

FIG. 6 is a conceptual diagram showing a configuration of a system 10$v$ in a third embodiment. Unlike the first embodiment, the system 10v in the present embodiment does not include the server 200. Moreover, a vehicle 100v in the present embodiment can travel by autonomous control of the vehicle 100v. In configurations of the system 10v and the vehicle 100v in the third embodiment, parts that are not particularly described are similar to those in the first embodiment.

In the present embodiment, a communication device 130 of the vehicle 100v can communicate with the distance measurement devices 300 and the process management device 400. A processor 111v of a vehicle control device 110v functions as a vehicle control section 115v, a position information acquisition section 116, a three-dimensional point cloud data acquisition section 210, a vehicle information acquisition section 215, a matching section 220, a matching condition decision section 225, an estimation section 230, and a command generation section 240 by executing a program PG3 stored in a memory 112v. The vehicle control section 115v can cause the vehicle 100v to travel by autonomous control, by acquiring a result of detection by a sensor, generating a travel control signal by using the result of detection, and causing the actuators 120 to operate by outputting the generated travel control signal. Moreover, in the present embodiment, the vehicle control section 115v functions as the command generation section 240. In addition to the program PG3, reference point cloud data 250 including model code point cloud data 251, a target route TR, and correction data 260 are stored in the memory 112v. The vehicle control device 110v in the third embodiment is an example of "control device" in the present disclosure.

Figure 7:
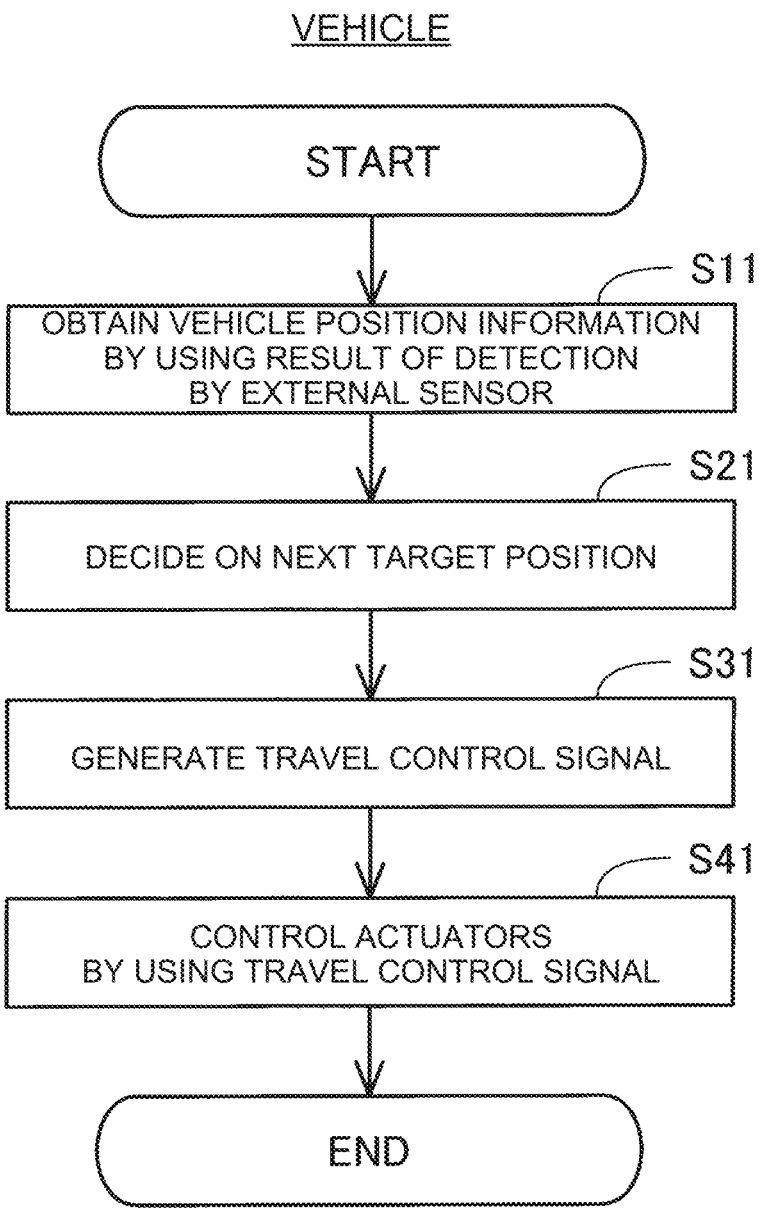
FIG. 7 is a flowchart showing a processing procedure for vehicle travel control in the third embodiment.

FIG. 7 is a flowchart showing a processing procedure for travel control of the vehicle 100v in the third embodiment. In S11, the vehicle 100v obtains vehicle position information by using a result of detection output from a distance measurement device 300 that is an external sensor. In S21, the vehicle 100v decides on a target position for the vehicle 100v to head for next. In S31, the vehicle 100v generates a travel control signal for causing the vehicle 100v to travel toward the decided target position. In S41, the vehicle 100v controls the actuators of the vehicle 100v by using the generated travel control signal, whereby the vehicle 100v is caused to travel according to parameters indicated by the travel control signal. The vehicle 100v repeats the cycle of obtaining vehicle position information, deciding on a target position, generating a travel control signal, and controlling the actuators, in each predetermined period. According to the system 10v in the present embodiment, it is possible to cause the vehicle 100v to travel by autonomous control of the vehicle 100v, without remote control of the vehicle 100v being performed by the server 200.

In S11 to S41 in the present embodiment, a command generation process similar to that in FIG. 4B is executed. The command generation process is executed each time the three-dimensional point cloud data acquisition section 210 of the vehicle 100v acquires new measured point cloud data from a distance measurement device 300 in charge of measuring the target vehicle 100v. Note that in the present embodiment, the target vehicle 100v refers to an own vehicle.

In the present embodiment, each step in FIG. 4B is executed by the processor 111v of the vehicle 100v. Note that in S100 in the present embodiment, for example, the vehicle information acquisition section 215 of the vehicle 100v may acquire identification information Vi transmitted from the process management device 400, or may acquire identification information Vi stored in the memory 112v beforehand. In S140, the command generation section 240 of the vehicle 100v generates, by using a position and an orientation estimated in S130, and outputs a control command. Specifically, the command generation section 240 in the present embodiment generates a travel control signal by using vehicle position information including the position and the orientation, and outputs the travel control signal. The vehicle control section 115v causes the vehicle 100v to travel by controlling the actuators 120 by using the travel control signal.

Matching can also be performed according to an appearance feature of a vehicle 100 by the vehicle control device 110v in the present embodiment described above. Accordingly, for example, even if various vehicles 100 with different appearance features from each other are to be autonomously controlled, matching can be performed according to an appearance feature of each vehicle 100. Accordingly, the possibility increases that matching can be performed with accuracy in the system 10.

Note that in another embodiment in which a vehicle 100v travels by autonomous control as in the present embodiment, the matching section 220 of the vehicle 100v may change at least one of the density of the point cloud in measured point cloud data and the density of the point cloud in the reference point cloud data 250, according to the separate distance as in the second embodiment. Moreover, in another embodiment in which a vehicle 100v travels by autonomous control, for example, the server 200 may be included in the system 10.

D. Other Embodiments (D1) Although the mobile object information includes the model code information Ti in the embodiments, the model code information Ti does not need to be included. For example, the mobile object information may include only the body color information Ci.

(D2) In the embodiments, manufacture information on a mobile object is used for the model code information Ti on the mobile object. In contrast, the manufacture information does not need to be used for the model code information Ti.

(D3) Although the matching section 220 changes the density of the point cloud in matching according to the mobile object information in the embodiments, the density of the point cloud does not need to be changed according to the mobile object information.

(D4) In each of the embodiments, a vehicle 100 only needs to include components that are movable by driverless driving, and, for example, may be in the form of a platform including components as described below. Specifically, a vehicle 100 may include at least the control device that controls travel of the vehicle 100 and the actuators of the vehicle 100v, in order to fulfill three functions of "traveling", "turning", and "stopping" by driverless driving. When the vehicle 100 externally acquires information for driverless driving, the vehicle 100 may further include the communication device. In other words, the vehicle 100 that is movable by driverless driving may be unequipped with at least one or some of interior parts such as a driving seat and a dashboard, may be unequipped with at least one or some of exterior parts such as a bumper and a fender, and may be unequipped with a bodyshell. In such a case, the remaining parts, such as the bodyshell, may be attached to the vehicle 100 by a time when the vehicle 100 is shipped from the factory, or the remaining parts, such as the bodyshell, may be attached to the vehicle 100 after the vehicle 100 in a state of being unequipped with the remaining parts, such as the bodyshell, is shipped from the factory. Each part may be attached in an arbitrary direction, such as from an upper side, a lower side, a front side, a rear side, a right side, or a left side of the vehicle 100, may be attached in the same direction, or may be attached in different directions from each other. Note that in the form of a platform, position decision can also be performed similarly to the vehicle 100 in the first embodiment. When matching in any of the embodiments is performed for the form of a platform, the mobile object information only needs to be information by which an appearance feature of the form of a platform can be identified, and may be, for example, information by which it can be identified whether or not each exterior part is attached. For such mobile object information, for example, manufacture information on a mobile object may be used.

(D5) In each of the embodiments, each of the various functional sections, such as the three-dimensional point cloud data acquisition section 210, the vehicle information acquisition section 215, the matching section 220, the matching condition decision section 225, the estimation section 230, and the command generation section 240, may be included in the vehicle 100 in the system 10. In such a case, as described in the third embodiment, all of the three-dimensional point cloud data acquisition section 210, the vehicle information acquisition section 215, the matching section 220, the matching condition decision section 225, the estimation section 230, and the command generation section 240 may be included in the vehicle 100, or one or some of the functional sections may be included in the vehicle 100. In the system 10, one or some, or all, of the functional sections may be included in an external device outside of the server 200 and the vehicle 100.

(D6) In the first embodiment, the processes from obtainment of vehicle position information up to generation of a travel control signal are executed by the server 200. In contrast, at least one or some of the processes from obtainment of vehicle position information up to generation of a travel control signal may be executed by the vehicle 100. For example, embodiments as described in (1) to (3) below may be possible.

(1) The server 200 may obtain vehicle position information, may decide on a target position for the vehicle 100 to head for next, and may generate a path from the current position of the vehicle 100 indicated in the obtained vehicle position information up to the target position. The server 200 may generate a path up to the target position between the current position and a destination, or may generate a path up to the destination. The server 200 may transmit the generated path to the vehicle 100. The vehicle 100 may generate a travel control signal such that the vehicle 100 travels on the path received from the server 200, and may control the actuators of the vehicle 100v by using the generated travel control signal.

(2) The server 200 may obtain vehicle position information, and may transmit the obtained vehicle position information to the vehicle 100. The vehicle 100 may decide on a target position for the vehicle 100 to head for next, may generate a path from the current position of the vehicle 100 indicated in the received vehicle position information up to the target position, may generate a travel control signal such that the vehicle 100 travels on the generated path, and may control the actuators of the vehicle 100v by using the generated travel control signal.

(3) In the embodiments described in (1), (2), an internal sensor may be mounted in the vehicle 100, and a result of detection output from the internal sensor may be used in at least one of the generation of a path and the generation of a travel control signal. The internal sensor is a sensor mounted in the vehicle 100. Specifically, examples of the internal sensor can include a camera, a LiDAR, a millimeter-wave radar, an ultrasound sensor, a GPS sensor, an accelerometer, a gyroscope sensor, and the like. For example, in the embodiment described in (1), the server 200 may acquire a result of detection by the internal sensor and, when generating a path, may reflect the result of detection by the internal sensor in the path. In the embodiment described in (1), the vehicle 100 may acquire a result of detection by the internal sensor and, when generating a travel control signal, may reflect the result of detection by the internal sensor in the travel control signal. In the embodiment described in (2), the vehicle 100 may acquire a result of detection by the internal sensor and, when generating a path, may reflect the result of detection by the internal sensor in the path. In the embodiment described in (2), the vehicle 100 may acquire a result of detection by the internal sensor and, when generating a travel control signal, may reflect the result of detection by the internal sensor in the travel control signal.

(D7) In the third embodiment, an internal sensor may be mounted in the vehicle 100v, and a result of detection output from the internal sensor may be used in at least one of the generation of a path and the generation of a travel control signal. For example, the vehicle 100v may acquire a result of detection by the internal sensor and, when generating a path, may reflect the result of detection by the internal sensor in the path. The vehicle 100v may acquire a result of detection by the internal sensor and, when generating a travel control signal, may reflect the result of detection by the internal sensor in the travel control signal.

(D8) In the first embodiment, the server 200 automatically generates a travel control signal to transmit to the vehicle 100. In contrast, the server 200 may generate a travel control signal to transmit to the vehicle 100, according to an operation by an external operator located outside of the vehicle 100. For example, the external operator may operate a maneuvering device that includes a display for displaying a captured image output from each external sensor, a steering wheel, an accelerator, and a brake pedal for remotely controlling the vehicle 100, and a communication device for communicating with the server 200 through wired communication or wireless communication, and the server 200 may generate a travel control signal according to an operation applied to the maneuvering device. Hereinafter, driving of the vehicle 100 through such control is also referred to as "remote manual driving". In an embodiment in which remote manual driving is performed, for example, a result of estimation of the position or the orientation of the vehicle 100 estimated by the estimation section 230 may be displayed on the display included in the maneuvering device. In such a case, on the display, the result of the position or orientation estimation may be displayed by using, for example, letters, characters, or symbols, or may be displayed on a map.

(D9) The vehicle 100 may be manufactured by combining a plurality of modules. A module refers to a unit including a plurality of parts that is assembled according to each portion or each function of the vehicle 100. For example, a platform of the vehicle 100 may be manufactured by combining a front module that constitutes a front portion of the platform, a center module that constitutes a central portion of the platform, and a rear module that constitutes a rear portion of the platform. Note that the number of modules included in the platform is not limited to three, and may be two or less, or four or more. Moreover, in addition to, or in place of, the parts included in the platform, parts included in a different portion of the vehicle 100 from the platform may be modularized. Various modules may include arbitrary exterior parts, such as a bumper and a grille, and arbitrary interior parts, such as a seat and a console. Not only the vehicle 100, a mobile object in an arbitrary aspect may be manufactured by combining a plurality of modules. For example, such a module may be manufactured by joining a plurality of parts by welding, with fixing devices, or the like, or may be manufactured by forming at least some of the parts included in the module into one unified part by casting. A casting scheme of forming one unified part, particularly a relatively large part, is also referred to as giga casting or mega casting. For example, the front module, the center module, and the rear module may be manufactured by using giga casting.

(D10) Transporting the vehicle 100 by utilizing travel of the vehicle 100 by driverless driving is also referred to as "self-propelled transport". A configuration for implementing the self-propelled transport is also referred to as "vehicle remote control self-driving transport system". Moreover, a production method of producing the vehicle 100 by utilizing the self-propelled transport is also referred to as "self-propelled production". In the self-propelled production, for example, in a factory where the vehicle 100 is manufactured, at least part of transport of the vehicle 100 is implemented by the self-propelled transport.

(D11) In each of the embodiments, one or some, or all, of the functions and the processes implemented by using software may be implemented by using hardware. One or some, or all, of the functions and the processes implemented by using hardware may be implemented by using software. For the hardware for implementing the various functions in each of the embodiments, for example, various circuits, such as an integrated circuit and a discrete circuit, may be used.

The present disclosure is not limited to the embodiments described above, and can be implemented in various configurations without departing from the gist thereof. For example, technical features in the embodiments that correspond to the technical features in the individual forms can be replaced or combined as appropriate, in order to solve one or some, or all, of the problems, or to achieve one or some, or all, of the effects. A technical feature can be excluded as appropriate unless the technical feature is described as essential in the present description.

What is claimed is:

1. A control device used to generate a control command to cause a mobile object to move by driverless driving, comprising:
   a matching section configured to perform matching using measured point cloud data and reference point cloud data in order to generate the control command;
   a mobile object information acquisition section configured to acquire mobile object information by which an appearance feature of the mobile object is identified, wherein
   the matching section is configured to perform the matching according to the mobile object information,
   the measured point cloud data is three-dimensional point cloud data of the mobile object acquired by using a distance measurement device, and
   the reference point cloud data is data representing three-dimensional point cloud data for reference; and
   a command generation section configured to generate the control command including a travel control signal to control actuators of the mobile object to perform moving of the mobile object by driverless driving to a target position based on the matching,
   wherein the travel control signal is sent to the actuators of the mobile object.

2. The control device according to claim 1, wherein:
   the mobile object information includes model code information by which a model code of the mobile object is identified;
   the reference point cloud data includes model code point cloud data corresponding to the model code; and
   the matching section is configured to perform the matching by using the model code point cloud data according to the model code information.

3. The control device according to claim 2, wherein the mobile object information includes, as the model code information, manufacture information used to manage process of manufacturing the mobile object.

4. The control device according to claim 1, wherein the matching section is configured to change at least one of density of a point cloud in the measured point cloud data and density of a point cloud in the reference point cloud data, according to the mobile object information.

5. The control device according to claim 4, wherein the matching section is configured to change at least one of the density of the point cloud in the measured point cloud data and the density of the point cloud in the reference point cloud data, according to a distance between the distance measurement device and the mobile object.

6. A control device used to generate a control command to cause a mobile object to move by driverless driving, comprising a processor configured to execute:
   performing matching using measured point cloud data and reference point cloud data in order to generate the control command;
   acquiring mobile object information by which an appearance feature of the mobile object is identified;
   performing the matching according to the mobile object information, wherein the measured point cloud data is three-dimensional point cloud data on the mobile object acquired by using a distance measurement device, and the reference point cloud data is data representing three-dimensional point cloud data for reference; and
   generating the control command including a travel control signal to control actuators of the mobile object to perform moving of the mobile object by driverless driving to a target position based on the matching,
   wherein the travel control signal is sent to the actuators of the mobile object.

7. The control device according to claim 6, wherein:
   the mobile object information includes model code information by which a model code of the mobile object is identified;
   the reference point cloud data includes model code point cloud data corresponding to the model code; and
   the processor is further configured to execute the matching by using the model code point cloud data according to the model code information.

8. The control device according to claim 7, wherein the mobile object information includes, as the model code information, manufacture information used to manage process of manufacturing the mobile object.

9. The control device according to claim 6, wherein the processor is further configured to execute changing at least one of density of a point cloud in the measured point cloud data and density of a point cloud in the reference point cloud data, according to the mobile object information.

10. The control device according to claim 9, wherein the processor is further configured to execute changing at least one of the density of the point cloud in the measured point cloud data and the density of the point cloud in the reference point cloud data, according to a distance between the distance measurement device and the mobile object.

* * * * *